Patented Aug. 5, 1947

2,424,983

UNITED STATES PATENT OFFICE 2,424,983

PRODUCTION OF THIOCYANATES

William H. Hill, Mount Lebanon, Pa., assignor, by mesne assignments, to Koppers Company, Inc., a corporation of Delaware No Drawing. Application April 28, 1943, Serial No. 484,911

4 Claims. (Cl. 23—75)

This invention relates to the manufacture of relatively pure sulphocyanogen salts and more particularly to processes of purifying thiocyanates.

Thiocyanates are customarily made from cyanides, from carbon bisulfide and ammonia, or are produced as byproducts in the purification of coal gas. Ammonium thiocyanate is obtained in coal gas plants as a primary material from which other thiocyanates can be manufactured in known manner. During the manufacture, the most important problem is that of purification. Because of the corrosiveness of thiocyanates a number of impurities are introduced by its contact with the manufacturing equipment. In the case of thiocyanates recovered from coal gases, impurities of the gas are also apt to be found in such thiocyanates. Some of these impurities are difficult to remove, among them being ammonium sulfate, ammonium thiosulfate, and others. Even repeated recrystallization does not completely eliminate these undesirable constituents. To obtain a desired degree of purity, chemical means of a rather complicated nature were heretofore generally employed. Successively crystallizing out ferrocyanides, carbonates, etc., from the more soluble thiocyanates contained in spent alkaline liquor obtained from coal gas purification systems, has not been commercially practicable.

In the process of the present invention, highly effective, simplified means are employed to remove the aforesaid and other impurities from impure thiocyanates. The invention will be described herein with particular reference to ammonium thiocyanate manufactured by scrubbing coal gas with a slurry of sulfur. In this operation the sulfur slurry together with ammonia and hydrogen sulfide in the gas forms ammonium polysulfide with which the hydrogen cyanide of the gas combines, forming ammonium thiocyanate. A solution of approximately 30 per cent concentration is thereby obtained which contains as impurities ammonium sulfate, ammonium thiosulfate, ammonium chloride, iron, and often arsenic sulfide in case the sulfur used in the process is derived from a gas purification process ("Thylox" process) utilizing solutions of arsenic compounds.

According to the present invention, impure thiocyanates, and especially impure ammonium thiocyanate, are easily separated from impurities associated therewith in consequence of their methods of manufacture, and are producible in highly refined form on a commercially feasible scale by their treatment with liquefied or even gaseous ammonia thereby effecting dissolution of the thiocyanates and leaving the impurities as residuum which can be easily separated therefrom by centrifugalization of the resultant solution, or by other known physical means. The present process is operative for the purpose either for treatment of impure thiocyanates that are in crystalline form or are in strong aqueous solution. Although previously liquefied ammonia is of service for the present purpose and is of greatest utility when treating said strong aqueous thiocyanate solutions, it has now been found that even crystalline thiocyanates rapidly absorb and can be easily dissolved by merely bringing them into contact with gaseous ammonia even under conditions of temperature and pressure at which ammonia itself will normally not liquefy.

The so-formed thiocyanate solutions exhibit a surprisingly low vapor pressure of ammonia and can be handled at ordinary temperatures and pressures at which ammonia cannot be kept in liquid phase. Upon removal of ammonia from a separated solution by evaporation, or the like, a thiocyanate is recovered as a residue which is substantially free of previously associated impurities but may contain, for instance, some iron thiocyanate because it is soluble in solutions formed by ammonia gas, as aforesaid. A method of removal of such iron, if preferred, will be hereinafter described.

The amount of ammonia, either gas or liquid, to be used in my process is not critical. Any quantity is satisfactory as long as a separable solution is obtained. While in most cases the vapor pressures of the solutions encountered in my process are so low that all the operations, including filtration or centrifugalization, can be handled at normal atmospheric temperatures and without the use of pressure equipment, I can, nevertheless, use elevated temperatures and elevated or superatmospheric pressures if so desired, or reduce the temperature appropriately to avoid increased pressures. For instance, in a commercial manufacturing operation it may be preferable to dissolve and filter or centrifuge using a very large proportion of ammonia, and in such cases the use of pressure equipment would be indicated. However, this is entirely without influence on the operativeness of the process and is merely a question of convenience.

Moreover, as afore-indicated, in carrying out the process of the invention, I am not confined to the purification of solid salts. A strong aqueous solution of a crude ammonium thiocyanate, such as is obtained on evaporation of the technical 30 per cent liquor and which may contain, for instance, 60–80 per cent ammonium thiocyanate on a weight basis, can be treated by introducing enough ammonia gas into the solution, either hot under pressure or after it has cooled down and set to a crystal mush, to make the final ratio of ammonia to water about 1:1 on the weight basis. Again this ratio is not critical, but it has a bearing on the amount of purification obtained. For instance, if the ratio is 1:1, salts like ammonium sulfate are somewhat soluble, while in a solution containing 2 parts of ammonia for 1 part of water, ammonium sulfate is soluble only to the extent of mere traces. Thus the choice of ratio will depend on the degree of purification desired and will be largely dictated by considerations of economy.

In dissolving ammonium thiocyanate in liquid ammonia or in liquefying it with ammonia gas, a certain amount of heat is given off which is preferably taken care of either by evaporation of an excess of liquid ammonia or by external cooling, or by simultaneous use of both evaporation of excess ammonia and external cooling, or otherwise. When using ammonia gas, for instance, it is normally satisfactory to keep the charge at a temperature of less than 30° and preferably in the approximate range of 5° to 10° C. by means of cooling coils or external cooling. When using liquid ammonia for the dissolution of ammonium thiocyanate, a surplus of liquid ammonia is used, which surplus, due to the low temperature of the liquid (about −35° C.), is sufficient to prevent, by its vaporization, a substantial rise in temperature resulting from evolution of heat caused by such dissolution. The vaporized ammonia is recompressed or recooled and is reused, as for instance, in a cycle comprising dissolution of thiocyanate, separation of undissolved impurities, vaporization of the ammonia from the resulting solution to obtain purified thiocyanate, and reuse of the vaporized ammonia for dissolving additional thiocyanate.

While the process of this invention is applied principally to ammonium thiocyanate, it is noted that other thiocyanates can likewise be purified as long as they are soluble in liquid ammonia or are liquefied by ammonia gas. Thus sodium thiocyanate, potassium thiocynate, calcium, barium and strontium thiocyanate, guanidine thiocyanate may be purified in the manner prescribed for ammonium thiocyanate. In a few of these cases the use of liquid ammonia may be preferred over the ammonia gas because not all of these salts form solutions of the same characteristics as the ammonium thiocyanate. Some show higher vapor pressures and are, therefore, best handled either confined in pressure equipment or at sufficiently low temperatures such as −30 to −40° C. at which the vapor pressure of liquid ammonia itself is not excessive.

The purification of these other thiocyanates is often especially facilitated by my invention. Thus, if calcium thiocyanate is made by treating an aqueous solution of ammonium thiocyanate with lime, the final product contains calcium sulfate, excess lime, and sometimes even calcium chloride as impurities. If the said final product is treated according to the present invention, excellent purification is obtained because all of these impurities are wholly insoluble in liquid ammonia while the calcium thiocyanate is very easily soluble. In similar manner excess sodium carbonate used in the conversion of aqueous ammonium thiocyanate to sodium thiocyanate is insoluble in liquid ammonia as is sodium sulfate and sodium thiosulfate which are formed during the conversion.

Furthermore, I have discovered that discolorations, such as from tarry and phenolic matter, which are present in thiocyanate liquors obtained in coke and gas plants, can be readily removed by treating the solutions, formed with ammonia gas or liquid ammonia, with activated carbons, such as powdered charcoal, Darco, Norit, etc. Other decolorizing agents, such as active clays, silica gel, etc., may also be used but are not nearly so effective. This discovery is quite surprising because it could not be foreseen that decolorizing agents would display the same efficiency in liquid ammonia or in solutions formed with ammonia gas as in aqueous solutions particularly since decolorization with activated carbons in aqueous solution is most effective at elevated temperatures.

The invention is applicable to any grade of thiocyanate. For instance, while in some cases the removal of iron is not necessary, it is in others. If iron is to be removed, any desired process may be utilized without affecting the operativeness of the present process. For instance, hydrogen sulphide may be employed to precipitate the iron. Important advantages may accrue from the use of my process if iron is removed in another manner. Thus if the iron is removed with the aid of water-soluble phosphates, an excess of the precipitating agent may safely be employed inasmuch as it is wholly insoluble in liquid ammonia and in solutions formed with ammonia gas, and is, therefore, eliminated with the other undesired impurities.

The invention will now be illustrated by the following specific examples:

Example 1.—500 parts by weight of a crude gray-black ammonium thiocyanate which analyzed 94.4% on the thiocyanate basis was treated with ammonia gas at atmospheric pressure, using water and ice for external cooling (about 4° or 5° C.), until a thin slurry resulted. 297 parts by weight of ammonia were thus added. The suspension was pressure-filtered through a fritted glass filter funnel, a dark brown clear solution resulting. Evaporation on a steam bath and air drying yielded a light brown solid analyzing 97.3% ammonium thiocyanate.

Example 2.—500 parts by weight of a crude gray-black ammonium thiocyanate which analyzed 94.4% on the thiocyanate basis were slowly added to 750 parts by weight of liquid ammonia which was at its boiling point (about −33° C.) and under atmospheric pressure. After all the salt was added the temperature of the resulting system was about −18° C. The gray-brown suspension was filtered under vacuum through a fritted glass filter funnel. Evaporation of the brown filtrate, first spontaneously and then on a steam bath, yielded a crumbly salt which was spread out on filter paper to dry in the air. The salt analyzed 97.6% ammonium thiocyanate.

Example 3.—500 parts by weight of a crude ammonium thiocyanate, which analyzed 94.4% on the thiocyanate basis, were liquefied with the aid of 425 parts by weight of ammonia gas at atmospheric pressure, using water and ice for external cooling (about 4° or 5° C.). Hydrogen sulfide was introduced into the slurry until a spot test with hydrogen sulfide indicated the absence of iron. The black slurry was filtered under 5 lbs.

air pressure, and the brown filtrate was evaporated until most of the ammonia and hydrogen sulfide had disappeared. 300 parts by weight of water were then added and the solution was slowly evaporated. As soon as the remainder of the ammonia and hydrogen sulfide had practically disappeared, 25 parts by weight of powdered charcoal were added and the suspension was filtered. The filtrate on cooling yielded snow-white crystals of ammonium thiocyanate analyzing 98.5% and meeting the specifications for chemically pure salt. Re-dissolving of this salt according to Example 2 raised the purity to 98.7% ammonium thiocyanate.

*Example 4.*—Mother liquor from the commercial production of ammonium thiocyanate is usually discarded on account of accumulated foreign salts though it still contains large quantities of the desired thiocyanate. 1000 parts by weight of such discard liquor were treated with 20.1 parts by weight of ammonia and 7.1 parts by weight of hydrogen sulfide and thereafter with 20 parts by weight of powdered charcoal. Filtration yielded a lemon yellow solution, which after evaporation to 130° C. (in the liquor) and filtration with another 10 parts by weight of charcoal produced a light colored salt on cooling of the solution. In similar manner, further crops of salt were obtained, the purities ranging from 95.9% down to 83.9%. The various crops were mixed, and this mixture analyzed 89.7%. It was treated with liquid ammonia according to Example 2, and the purified salt thus obtained showed an ammonium thiocyanate content of 94.3%.

*Example 5.*—A 30% crude ammonium thiocyanate liquor, as it is obtained by scrubbing coke oven gas before the ammonia saturator with a slurry of sulfur, was treated at about 5° C. with ½% hydrogen sulfide and 1% ammonia gas (both percentages reckoned on the basis of neat ammonium thiocyanate in the liquor). The resultant suspension was next stirred with 5% (on the neat basis) of charcoal, and filtered. The filtrate was evaporated until the temperature in the liquor registered about 135° C. During this heating period sulfur was precipitated, derived from the decomposition of polysulfides contained in the liquor, and also some arsenic sulfide which was derived from the sulfur used in making the crude liquor. This precipitate was filtered off hot, whereupon whitened ammonium thiocyanate crystallized out on cooling to about 30° C. It was dissolved with 80% of its weight of ammonia gas at atmospheric pressure, the temperature during the addition being kept below 10° C. Filtration and evaporation of the ammonia, along the lines of Examples 1 and 2 yielded a salt of 98.8% purity.

*Example 6.*—The same procedure was followed as in Example 5, but in the end the salt was dissolved in 1½ times its weight of liquid ammonia, instead of using ammonia gas. The recovered salt analyzed 98.9% ammonium thiocyanate.

*Example 7.*—A crude 30% ammonium thiocyanate liquor as described in Example 5 was treated at about 5° C. with 1% hydrogen sulfide and 2% ammonia (on the neat basis), stirred with 5% (on the neat basis) of Darco #G-60, a commercial decolorizing agent, filtered and then evaporated in the vacuum of an ordinary water suction pump to an end temperature of about 70° C. Precipitated sulfur, arsenic sulfide, and complex greenish-blue iron cyanides were filtered off, and the filtrate was cooled to about 10° C., whereupon it set to an almost solid mass. Ammonia gas was added at atmospheric pressure (keeping the temperature under 10° C.) until the resultant solution contained about 1 part of ammonia for every part of water. The light slurry was filtered to remove insoluble ammonium sulfate, ammonium thiosulfate, etc., and the filtrate was evaporated until most of the ammonia had disappeared. The salt thus recovered analyzed 98.6% ammonium thiocyanate.

*Example 8.*—A crude 30% ammonium thiocyanate liquor as described in Example 5 was spray dried to a fine powder, analyzing 89.3%. This salt was liquefied with 80% its weight of ammonia gas at atmospheric pressure (keeping the temperature at about 5° C.), filtered, and the ammonia evaporated. There was thus recovered a brown-red salt analyzing 93.8% ammonium thiocyanate.

*Example 9.*—48.2 parts by weight of ammonia were introduced in 1000 parts by weight of discard liquor similar to that used in Example 4. Then 20 parts by weight of diammonium phosphate in 40 parts by weight of water were added and the solution was slowly heated to 100° C. During the heating period, enough ammonia was passed into the solution to keep it ammoniacal, 50 parts by weight of powdered charcoal were added and the suspension was filtered. The solution was cooled down, ammonia still being passed in to keep it ammoniacal, and allowed to stand for three days. A brown precipitate was filtered off, and the solution was evaporated to a temperature of 135° C. in the liquid. On cooling and filtering, a pale tan salt was obtained which was treated with ammonia gas according to Example 1 to remove impurities insoluble in the solution formed with the ammonia gas. Excess ammonium phosphate was easily removed in this manner and the salt obtained on evaporation of the ammonia analyzed 94.6%, which is very close to the figure for the mixed crop in Example 4.

A purified sodium thiocyanate is prepared as follows: A crude ammonium thiocyanate liquor as it is obtained by scrubbing coke oven gas before the ammonia saturator with a slurry of sulfur is treated at about 5° C. with hydrogen sulfide and ammonia. The resultant suspension is next stirred with charcoal and filtered. The filtrate is evaporated until the temperature in the liquor registers about 135° C. During this heating period sulfur is precipitated, derived from the decomposition of polysulfides contained in the liquor, and also some arsenic sulfide which is derived from the Thylox sulfur used in making the crude liquor. This precipitate is filtered off hot, and then sodium carbonate is added to the filtrate, using a small excess over the amount needed to convert to sodium thiocyanate. Heating is continued until most of the ammonia disappears, water being added from time to time to keep the boiling temperature at about 135° C. On cooling, a crude sodium thiocyanate crystallizes out which is filtered off and dissolved in liquid ammonia as directed in Example 2. The pure sodium salt recovered after filtration and evaporation of the ammonia analyzes over 95% thiocyanate. Evidently excess sodium carbonate, sodium sulfate, and sodium thiosulfate formed by double decomposition is removed.

To prepare calcium thiocyanate, the procedure specified for the preparation of sodium thiocyanate is followed except that calcium hydroxide is substituted for the sodium carbonate. During the ammonia gas solution purification step, calcium hydroxide, calcium sulfate, calcium thiosulfate, and calcium chloride are removed without trouble, and the recovered pure salt analyzes over 95% thiocyanate, some moisture being retained.

To prepare purified guanidine thiocyanate, a crude technical ammonium thiocyanate is converted to a crude guanidine thiocyanate by protracted heating at 170–180° C. The solidified melt is an almost black mixture of guanidine thiocyanate, unconverted ammonium thiocyanate, various triazines, iron sulfide (derived from the iron of the original salt and the hydrogen sulfide evolved during the conversion), and the various salts contained in the original material. The mixture is coarsely crushed and dissolved in twice its weight of liquid ammonia. Darco #G-60 is added to the extent of 5% of its weight, and the slurry is filtered under pressure through a fritted glass funnel. A sparkling clear filtrate of purple color is obtained. After evaporation of the ammonia, there remains a snow-while product. The purple color disappears completely. The product analyzes over 90% guanidine thiocyanate, the remainder being substantially ammonium thiocyanate.

The expression, "commercial" thiocyanate, is employed in the appending claims in the technical sense, that is, it refers to a commodity that contains thiocyanate in major proportion and in a form obtained in technical and commercial processes.

What is claimed is:

1. A process of separating a thiocyanate from crude thiocyanate material, which process comprises: bringing together uncombined ammonia in gaseous phase and solid crude thiocyanate material containing a major proportion of thiocyanate to form a solution of the thiocyanate, removing the dissolved thiocyanate from undissolved material while maintaining the thiocyanate in solution, evaporating the ammonia from the resulting solution to obtain purified thiocyanate, and bringing together the resulting separated gaseous ammonia and additional solid crude thiocyanate material for recovery of thiocyanate therein.

2. A process of separating a thiocyanate from crude thiocyanate material, which process comprises: bringing together uncombined ammonia in gaseous phase and solid crude thiocyanate material containing discoloring matter and a major proportion of thiocyanate, thereby forming a solution of thiocyanate containing dissolved discoloring matter; treating the said solution with a decolorizing agent, separating the decolorizing agent and discoloring matter from the said solution, evaporating the ammonia from the resulting solution to obtain purified thiocyanate, and bringing together the resulting separated gaseous ammonia and additional solid crude thiocyanate material for recovery of thiocyanate therein.

3. A process of separating a thiocyanate from crude thiocyanate material, which process comprises: bringing together uncombined ammonia in gaseous phase and solid crude thiocyanate material containing iron as an impurity and containing a major proportion of thiocyanate, thereby forming a solution of thiocyanate containing dissolved iron; treating the said solution with an agent for precipitating iron, separating the precipitated iron from the resulting solution, evaporating the ammonia from said solution to obtain purified thiocyanate, and bringing together the resulting separated gaseous ammonia and additional solid crude thiocyanate material for recovery of thiocyanate therein.

4. A process of separating a thiocyanate from crude thiocyanate material, which process comprises: bringing together uncombined ammonia in gaseous phase and solid crude thiocyanate material containing iron and discoloring matter as impurities and containing a major proportion of thiocyanate, thereby forming a solution of thiocyanate containing dissolved iron and discoloring matter; treating the said solution with an agent for precipitating iron and with a decolorizing agent, separating the resulting undissolved matter from the said solution, evaporating the ammonia from the resulting solution to obtain purified thiocyanate, and bringing together the resulting separated gaseous ammonia and additional solid crude thiocyanate material for recovery of thiocyanate therein.

WILLIAM H. HILL

REFERENCES CITED

The following references are of record in the file of this patent:

UNITED STATES PATENTS

| Number | Name | Date |
|---|---|---|
| 1,648,224 | Hall | Nov. 8, 1927 |
| 1,947,570 | Pranke | Feb. 20, 1934 |
| 1,314,237 | Arnold | Aug. 26, 1919 |
| 2,286,349 | Davis | June 16, 1942 |

OTHER REFERENCES

Williams, Cyanogen Compounds, Churchill, London, 1915, pages 193, 202, 211.

Seidell, Solubilities of Inorganic and Organic Compounds, vol. I, Van Nostrand, N. Y., 1919, page 63; vol. II, Van Nostrand, N. Y., 1928, page 1952.

Mellor, Inorganic and Theoretical Chemistry, vol. X, Longmans, N. Y., 1930, page 143.

Liquid Ammonia as a Solvent, article by H. Hunt, Chemical Abstracts, vol. 26, page 5477, 1932.

Journal of American Chemical Society, vol. 54, pages 3509–3512, 1932.